(12) United States Patent
Kim

(10) Patent No.: US 12,348,113 B2
(45) Date of Patent: Jul. 1, 2025

(54) DRIVING MOTOR EQUIPPED WITH BLDC MOTOR, AND ACTUATOR USING SAME

(71) Applicant: AMOTECH CO., LTD., Incheon (KR)

(72) Inventor: Byung Soo Kim, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 251 days.

(21) Appl. No.: 18/030,678

(22) PCT Filed: Oct. 28, 2021

(86) PCT No.: PCT/KR2021/015285
§ 371 (c)(1),
(2) Date: Apr. 6, 2023

(87) PCT Pub. No.: WO2022/092839
PCT Pub. Date: May 5, 2022

(65) Prior Publication Data
US 2023/0387749 A1 Nov. 30, 2023

(30) Foreign Application Priority Data

Oct. 28, 2020 (KR) .................. 10-2020-0141003

(51) Int. Cl.
*H02K 7/116* (2006.01)
*H02K 1/14* (2006.01)
(Continued)

(52) U.S. Cl.
CPC .............. *H02K 7/1166* (2013.01); *H02K 1/14* (2013.01); *H02K 1/2706* (2013.01); *H02K 7/003* (2013.01);
(Continued)

(58) Field of Classification Search
CPC ...... H02K 7/1166; H02K 11/215; H02K 1/14; H02K 21/16; H02K 7/81
(Continued)

(56) References Cited

U.S. PATENT DOCUMENTS

| 6,577,034 B1* | 6/2003 | Kitamura | ............... H02K 7/116 310/90 |
| 2007/0040463 A1* | 2/2007 | Zorweg | .................... H02K 5/15 74/606 R |

(Continued)

FOREIGN PATENT DOCUMENTS

| CN | 206100651 U | * | 4/2017 |
| KR | 20090094210 | | 9/2009 |

(Continued)

OTHER PUBLICATIONS

International Search Report—PCT/KR2021/015285 dated Feb. 7, 2022.

*Primary Examiner* — Jose A Gonzalez Quinones
(74) *Attorney, Agent, or Firm* — CANTOR COLBURN LLP

(57) ABSTRACT

Provided is an actuator including: a housing having first and second accommodation spaces; a driving motor having a BLDC type motor installed in the first accommodation space of the housing and generating a rotational output from a rotor; a printed circuit board (PCB) mounted on an upper side of the driving motor and having a motor driving circuit mounted for generating a motor driving signal according to reception of an external control signal; a gear train installed on an upper portion of the PCB in a longitudinal direction to reduce the rotational output of the driving motor to increase torque; and an output shaft installed in the second accommodating space of the housing and outputting a torque increased rotational output transmitted through the gear train to the outside of the housing.

8 Claims, 16 Drawing Sheets

(51) Int. Cl.
  *H02K 1/2706*    (2022.01)
  *H02K 7/00*      (2006.01)
  *H02K 7/08*      (2006.01)
  *H02K 11/215*    (2016.01)
  *H02K 21/16*     (2006.01)
  *F21S 41/657*    (2018.01)

(52) U.S. Cl.
  CPC ............ *H02K 7/081* (2013.01); *H02K 7/088* (2013.01); *H02K 11/215* (2016.01); *H02K 21/16* (2013.01); *F21S 41/657* (2018.01); *H02K 2203/03* (2013.01)

(58) Field of Classification Search
  USPC ............ 310/12.01, 12.031, 75 R, 83, 89, 99
  See application file for complete search history.

(56) References Cited

U.S. PATENT DOCUMENTS

2010/0060092 A1*   3/2010   Blakesley ............ H02K 5/1677
                                                    310/83
2014/0225466 A1*   8/2014   Sumiya ................ H02K 7/116
                                                    310/198

FOREIGN PATENT DOCUMENTS

| KR | 20120091139      | 8/2012 |
| KR | 101241920 B1 *   | 3/2013 |
| KR | 20160092823      | 8/2016 |
| KR | 20170050869      | 5/2017 |
| KR | 20180068835      | 6/2018 |
| KR | 20190039436      | 4/2019 |

* cited by examiner

DRIVING MOTOR EQUIPPED WITH BLDC MOTOR, AND ACTUATOR USING SAME

TECHNICAL FIELD

The present invention relates to an actuator, and more particularly, to a driving motor having a slim BLDC motor vertically mounted in a housing, and an actuator using the driving motor.

BACKGROUND ART

An electric actuator rotates or linearly moves a passive object to be driven with a high torque rotational force obtained by torque conversion of the rotational force generated from a rotating power source.

In general, a conventional actuator uses a DC motor as a rotating power source, and the rotor output of the DC motor is torque-converted through a gear train in which a worm gear and a plurality of spur gears which are integrally formed in a rotor output end are gear-coupled to generate a high torque rotational output from an actuator output end.

Since the conventional electric actuator uses a DC motor with an external casing as a rotating power source, the magnet for position sensing of the rotor is not embedded in the casing, but attached separately to the outside and sensed using a Hall sensor, so the structure of connecting the Hall sensor from the PCB with the motor driving circuit is complicated.

If the actuator does not use a Hall sensor, only forward and reverse rotational motions are possible.

In general, the actuator has a low height of the housing as a whole product in use, and one of the horizontal and the vertical is configured to have a long shape. Accordingly, it is difficult to employ a structure in which a DC motor having an outer casing is vertically mounted on the inner bottom of the housing.

In the case of using a DC motor, the brake torque should be increased using a worm gear because the rotor should be held in a stationary position when external pressure is applied on the output shaft that rotates forward and reverse.

To use a worm gear and a worm wheel in a DC motor and to deliver power to the position where the output shaft is located, the connection therebetween is usually formed using a spur gear, in which case the following problems exist.

First, since the housing height of the actuator is low, there is a problem in that a DC motor is generally laid and applied, and thus an assembly structure is difficult and a unit cost is increased. That is, there is a problem in securing an assembly space due to the casing of the DC motor and the bearing that needs to hold the worm shaft.

Second, the structure of connecting the motor power in a controller becomes complicated.

Third, position information of the rotor is required for accurate position control in the actuator. To this end, since a position sensing magnet is placed at the bottom of a warm gear of a DC motor and a position sensing Hall sensor IC is applied, the structure of connecting a Hall sensor to a printed circuit board (PCB) is complicated to use DC power and to sense the position.

Fourth, in a gear train that uses multiple spur gears to obtain a large reduction ratio, the tolerance the rotation power of the driving motor increases, resulting in a large backlash and difficulty in controlling the precise position.

Korean Patent Application Publication No. 10-2017-0050869 (Patent Document 1) discloses an electric actuator using a direct-current (DC) motor, including: a power input unit including the DC motor; a planetary decelerator including a planetary gear for increasing torque by receiving a driving force from the power input unit and having an output shaft; an accelerator with a detachable cover that receives driving force from the planetary decelerator, increases the number of rotations lowered in proportion to the increased torque, and opens one side; a screw shaft having a screw thread to convert the rotational motion transmitted from the accelerator into a linear motion; and a cylinder unit having a displacement nut screw-coupled to the screw shaft in a rotational manner to move forward and backward by rotation of the screw shaft.

As the electric actuator of Patent Document 1 uses a DC motor, precise position control is difficult, and assembly productivity is reduced by adopting the planetary decelerator for torque enhancement.

In general, when the size of the actuator is small, the size of the driving motor is small, and thus the output becomes small. In this case, in order to obtain a high torque output value at the output terminal of the actuator, the rpm of the motor should be large, and the reduction ratio should be large using multiple spur gears, resulting in an increase in noise.

Moreover, conventionally, when an external force greater than or equal to a preset force is applied to a passive object to be driven by the output shaft of the actuator, there is no slip function and thus, there is a problem that the internal structure is damaged due to the return of the passive object.

DISCLOSURE

Technical Problem

To solve the conventional problems, it is an objective of the present invention to provide an actuator having a power transmission structure capable of minimizing backlash by a gear train changing structure in which a worm wheel and a worm gear are integrally formed at intervals on a power transmission shaft to minimize the number of coupling gears.

It is another objective of the present invention to provide an actuator having an output shaft of a slip function by a damage prevention structure of an internal structure due to a return of a passive object (or a table), by providing an upper/lower slip gear coupling unit on an output shaft and generating slip in the slip gear coupling unit when an external force more than a preset force is applied to the passive object.

It is another objective of the present invention to provide a slim driving motor and an actuator using the same, in which bearings installed on a cover and a housing bottom, respectively, are assembled with a core motor-shaped BLDC motor vertically on the housing bottom, to improve the problem of the conventional structure of using a DC motor embedded inside a low-height housing.

It is another objective of the present invention to provide a driving motor capable of connecting a stator and a PCB by using an inexpensive press fit without an inner hole instead of an expensive press fit having a retractable object coupling unit (an inner hole) which is press-fitted and coupled to the PCB, and an actuator using the same.

It is another objective of the present invention to provide an actuator with an output worm gear of a multiple thread screw as a gear train to prevent a reduction gear ratio from increasing while lowering the rpm of a driving motor, which is a factor of noise increase.

It is another objective of the present invention to provide an actuator whose size is miniaturized by optimally arranging a power transmission shaft inside a housing in which a worm wheel and a worm gear constituting a small driving motor and a gear train are integrally formed.

Technical Solution

According to an aspect of the present invention, there is provided a driving motor for an actuator including: a housing having first and second accommodation spaces inside a rectangular barrel-shaped body case, and having a rotor bearing protruding from the bottom of the first accommodation space; a rotor having a lower end portion of the rotor support rotatably coupled to an outer circumference of the rotor bearing; and a stator arranged outside the rotor with an air gap and generating a rotating magnetic field to rotate the rotor, wherein a first worm gear is integrally formed on an outer circumferential portion of an upper end of the rotor support.

The rotor may include a rotor support having a lower end portion formed in a cup shape so that the lower end portion is rotatably coupled to the rotor bearing and having a first worm gear integrally formed on the outer periphery of the upper end thereof; a back yoke placed on the outer periphery of the lower end of the rotor support to form a magnetic circuit; and a plurality of magnets placed on the outer periphery of the back yoke.

In addition, the rotor bearing may include: a bearing housing protruding from the bottom of the housing and having a recessed groove; and a rotor shaft bearing rotatably embedded in the recessed groove of the bearing housing and reducing frictional force when the rotor rotates while the upper end thereof comes in contact with the lower surface of the rotor support.

Moreover, the upper portion of the rotor support may be rotatably supported by a rotor shaft bearing inserted into the bottom surface of a cover.

The stator includes: a stator core including a plurality of teeth each having a T-shaped front end portion extending in an axial direction and a back yoke connected to the plurality of teeth to form a magnetic circuit; upper and lower insulators surrounding a coil winding region of each of the plurality of teeth in upper and lower portions thereof; and a coil wound around an outer circumferential surface of each of the upper and lower insulators, wherein the back yoke has a rectangular shape, and through-holes for fixing the back yoke to the body case may be formed at edges of the rectangular shape.

The driving motor for an actuator according to the present invention further includes a printed circuit board (PCB) which is arranged on the upper portion of the driving motor and on which a motor driving circuit is mounted, and, in order to connect a stator coil of the driving motor to the PCB, the front end portion is press-fitted into the PCB, and a press fit terminal without an inner hole may be used.

In this case, a gear train may be installed on the upper portion of the PCB to increase torque by decelerating the rotational output of the driving motor, and an output shaft having a second worm wheel may be installed on the upper portion of the second accommodation space.

In addition, the gear train has a first worm wheel and an output worm gear formed integrally with an interval on the power transmission shaft, and the first worm wheel is gear-coupled to the first worm gear formed integrally on the upper portion of the rotor, and the output worm gear is gear-coupled to the second worm wheel of the output shaft to transmit the rotational power.

In addition, the driving motor for an actuator according to the present invention may further include a Hall sensor installed on a lower surface of the PCB corresponding to an upper portion of the rotor to generate a rotor position signal when the rotor rotates.

According to another aspect of the present invention, there is provided an actuator including: a housing having first and second accommodation spaces; a driving motor having a BLDC type motor installed in the first accommodation space of the housing and generating a rotational output from a rotor; a printed circuit board (PCB) mounted on an upper side of the driving motor and having a motor driving circuit mounted for generating a motor driving signal according to reception of an external control signal; a gear train installed on an upper portion of the PCB in a longitudinal direction to reduce the rotational output of the driving motor to increase torque; and an output shaft installed in the second accommodating space of the housing and outputting a torque increased rotational output transmitted through the gear train to the outside of the housing.

In addition, the actuator according to the present invention further includes a first worm gear integrally formed in an extension portion extending to the upper portion of the rotor of the driving motor, wherein the gear train may include: a power transmission shaft; a first worm wheel formed on one side of the power transmission shaft and gear-coupled to the first worm gear; and a second worm gear formed on the other side of the power transmission shaft.

In this case, the second worm gear may be formed of a multiple thread screw.

The output shaft includes: a first shaft having a second worm wheel installed at an upper portion thereof to be gear-coupled to the second worm gear of the power transmission shaft and an upper slip gear installed at a lower end thereof; and a second shaft in which a lower slip gear engaged with the upper slip gear is installed at an upper end thereof is installed and the lower end portion is extended to the outside of the housing, wherein the upper slip gear and the lower slip gear have an upper portion and a lower portion engaged with each other in a triangular saw tooth shape, and thus slip may occur when external pressure is applied in a single direction.

In addition, a coil spring or a plate spring may be coupled to the lower side of the lower slip gear so that slip occurs only when a certain force or more is applied to the slip gear.

The upper portion of the first shaft may be rotatably supported by an output shaft bearing installed in the cover, the second shaft may be rotatably supported by a pair of bearings installed in the bearing housing installed on the bottom of the body case, and the second shaft may be extended to the outside of the body case.

The driving motor includes: a rotor bearing protruding from a bottom of the housing; a rotor having a lower end of the rotor support rotatably coupled to an outer circumference of the rotor bearing; and a stator arranged outside the rotor with an air gap and generating a rotating magnetic field to rotate the rotor, and a first worm gear may be integrally formed on an outer circumferential portion of an upper end of the rotor support.

The actuator according to the present invention may further include first and second guide protrusions protruding from the bottom surface of the cover at intervals to prevent the power transmission shaft from being bent or separated when external pressure equal to or greater than a preset magnitude is applied to the worm gear of the power transmission shaft.

In addition, the actuator according to the present invention may further include an output coupling portion coupled to a second shaft extending to the outside of the body case by using a key.

Advantageous Effects

As described above, in this invention, backlash may be minimized by using a gear train change structure that minimizes the number of coupled gears using a power transmission shaft integrated with a worm wheel and worm gear with an interval, and overall size may be reduced and space may be secured when compared to a gear train that combines multiple spur gears, increasing design freedom and reducing cost.

In addition, the present invention includes an output shaft of a slip function by a damage prevention structure of an internal structure due to a return of a passive object, by providing an upper/lower slip gear coupling unit on an output shaft and generating slip in the slip gear coupling unit when an external force more than a preset force is applied to the passive object.

Further, in the present invention, a BLDC motor with a vertical assembly structure is provided with a structure of assembling bearings installed on a cover and a housing bottom, respectively, with a core motor-shaped BLDC motor, to improve the problem of the conventional structure of using a DC motor embedded inside a low-height housing.

In addition, according to the present invention, since a printed circuit board (PCB) having a motor driving circuit embedded in an upper portion of a driving motor is installed, a Hall sensor for detecting a rotor position signal may be directly mounted on a lower surface of the PCB, thereby easily adopting a BLDC motor as the driving motor.

The present invention provides a small driving motor capable of connecting a stator and a PCB by using an inexpensive press fit without an inner hole instead of an expensive press fit having a retractable object coupling unit (an inner hole) which is press-fitted and coupled to the PCB, and an actuator using the same.

The present invention is provided with an output worm gear of a multiple thread screw as a gear train to prevent a reduction gear ratio from increasing while lowering the rpm of a driving motor, which is a factor of noise increase.

The present invention provides an actuator whose size is miniaturized by optimally arranging a power transmission shaft inside a housing in which a worm wheel and a worm gear constituting a small driving motor and a gear train are integrally formed.

BEST MODE FOR CARRYING OUT THE INVENTION

Figure 1A:
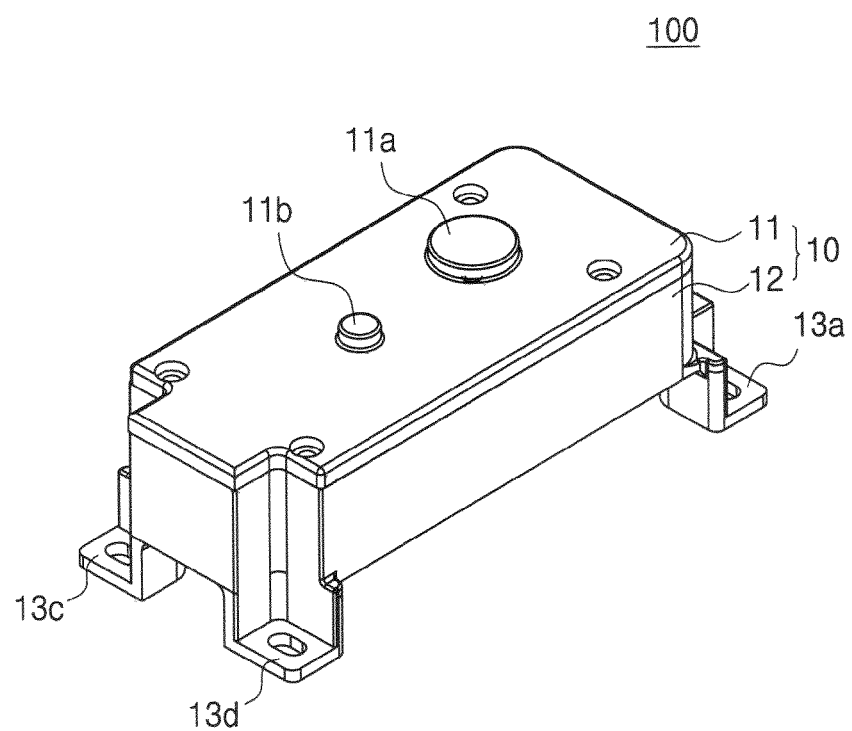
FIGS. 1A to 1D are a perspective view, a plan view, and an A-A-line cross-sectional view and a B-B-line cross-sectional view of an actuator using a BLDC type driving motor according to an embodiment of the present invention, respectively.
Figure 1B:
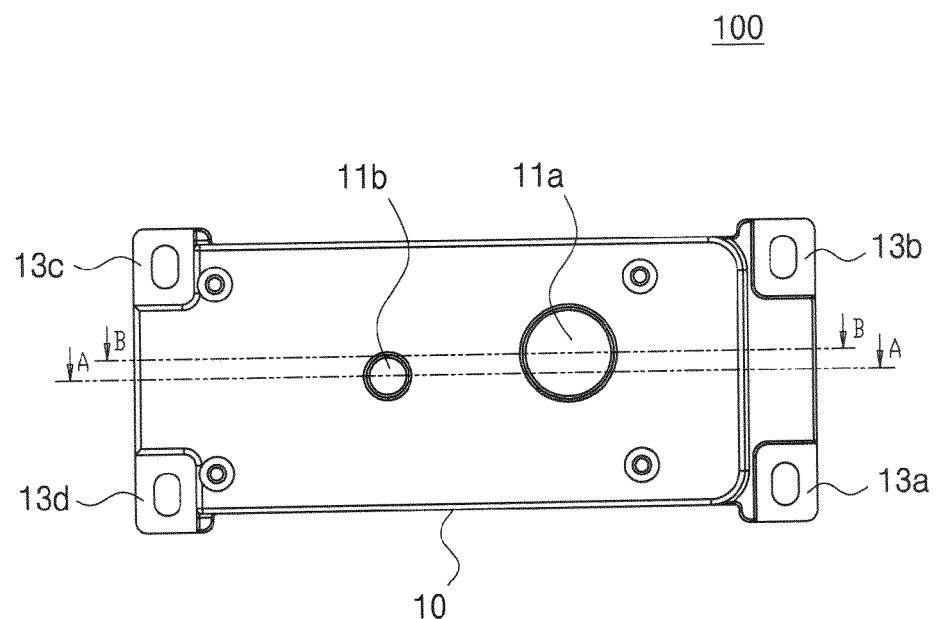
Figure 1C:
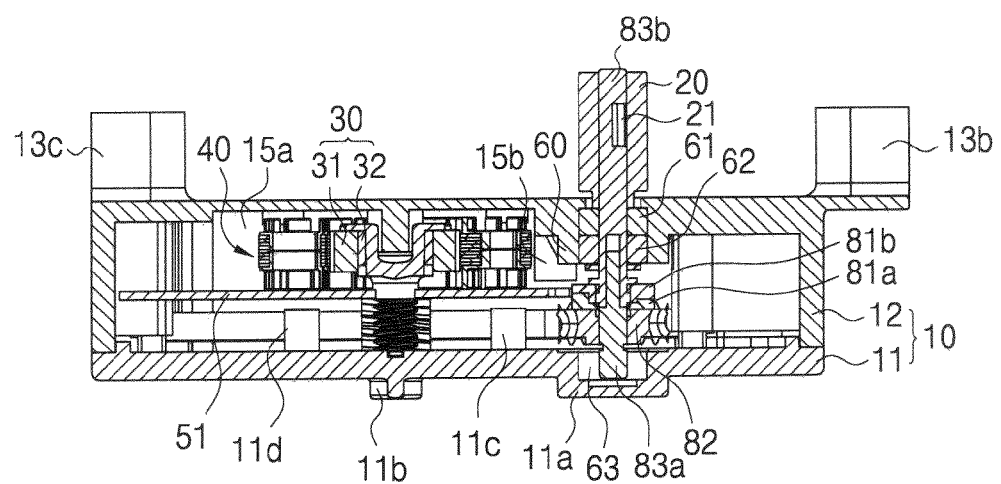
Figure 1D:
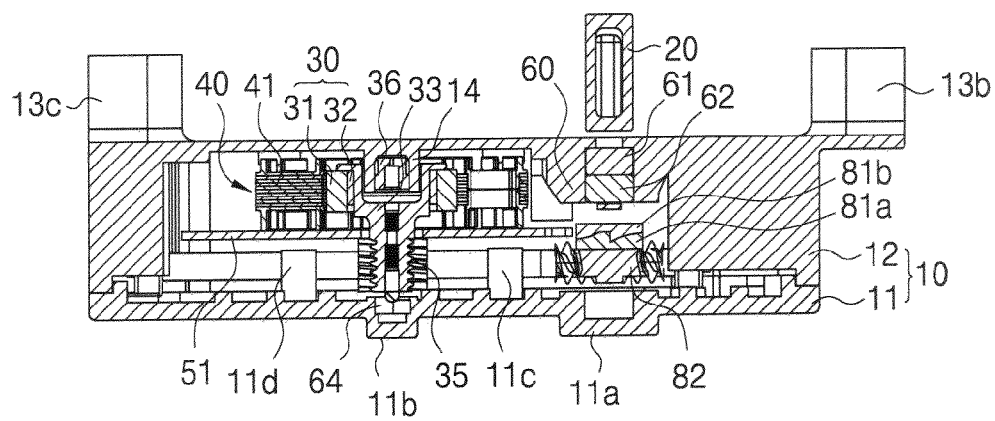
Figure 2:
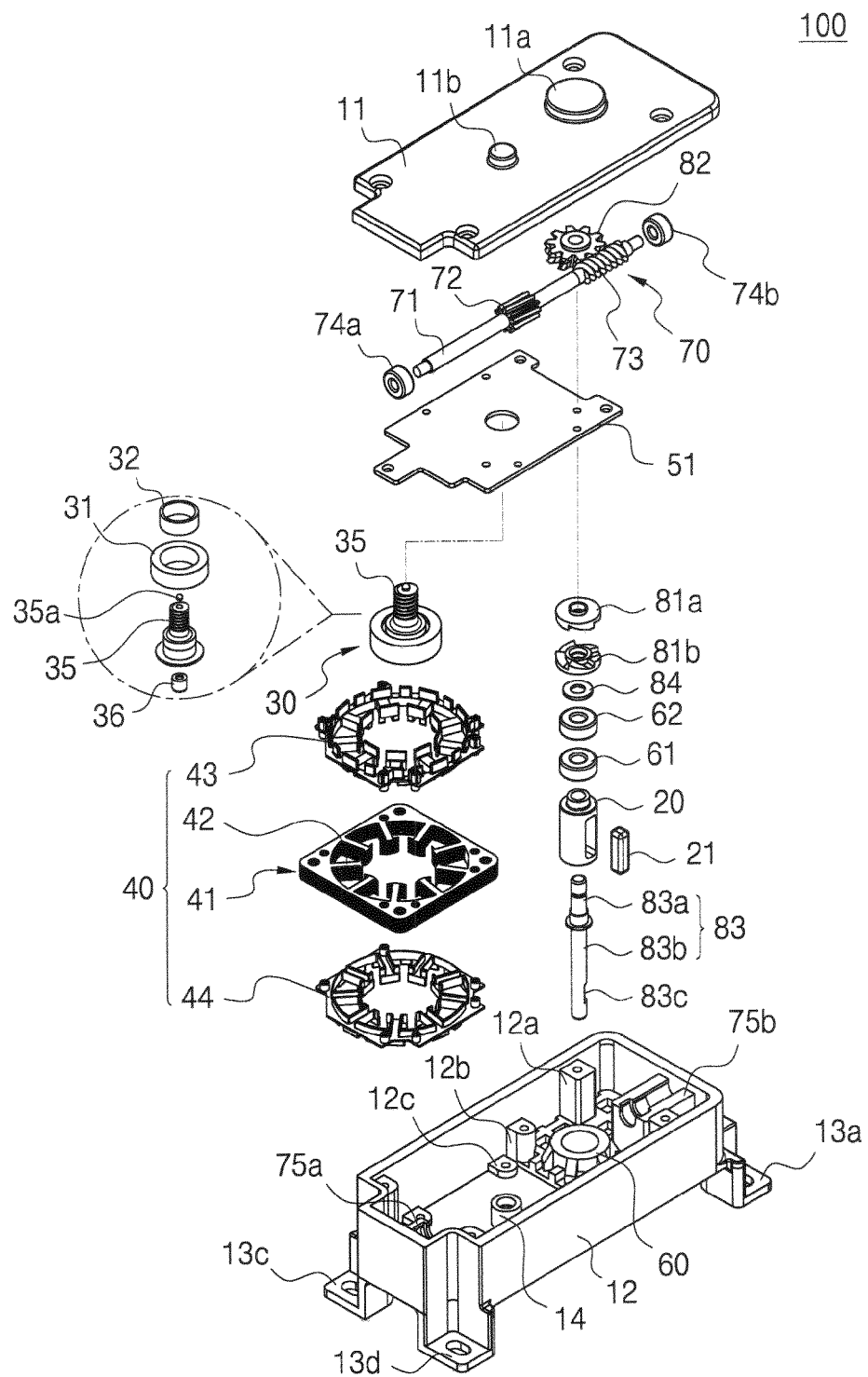
FIG. 2 is a complete exploded perspective view of the actuator shown in FIG. 1.
Figure 3A:
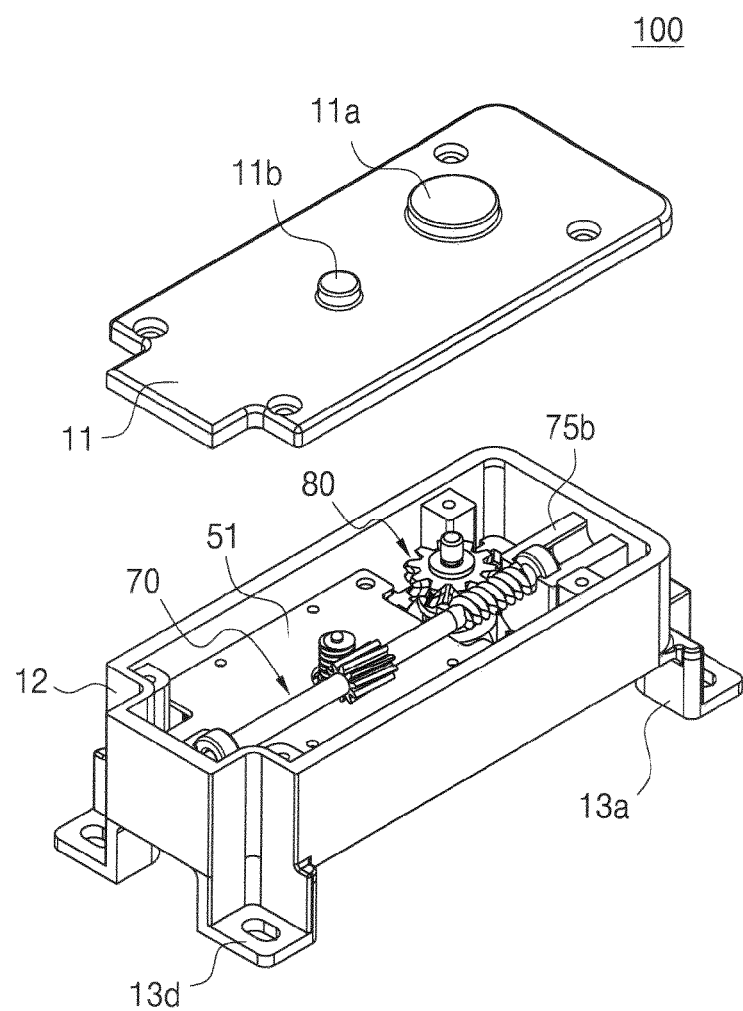
FIGS. 3A and 3B are respectively an exploded perspective view of a cover of the actuator shown in FIG. 1 and an exploded perspective view of each module.
Figure 3B:
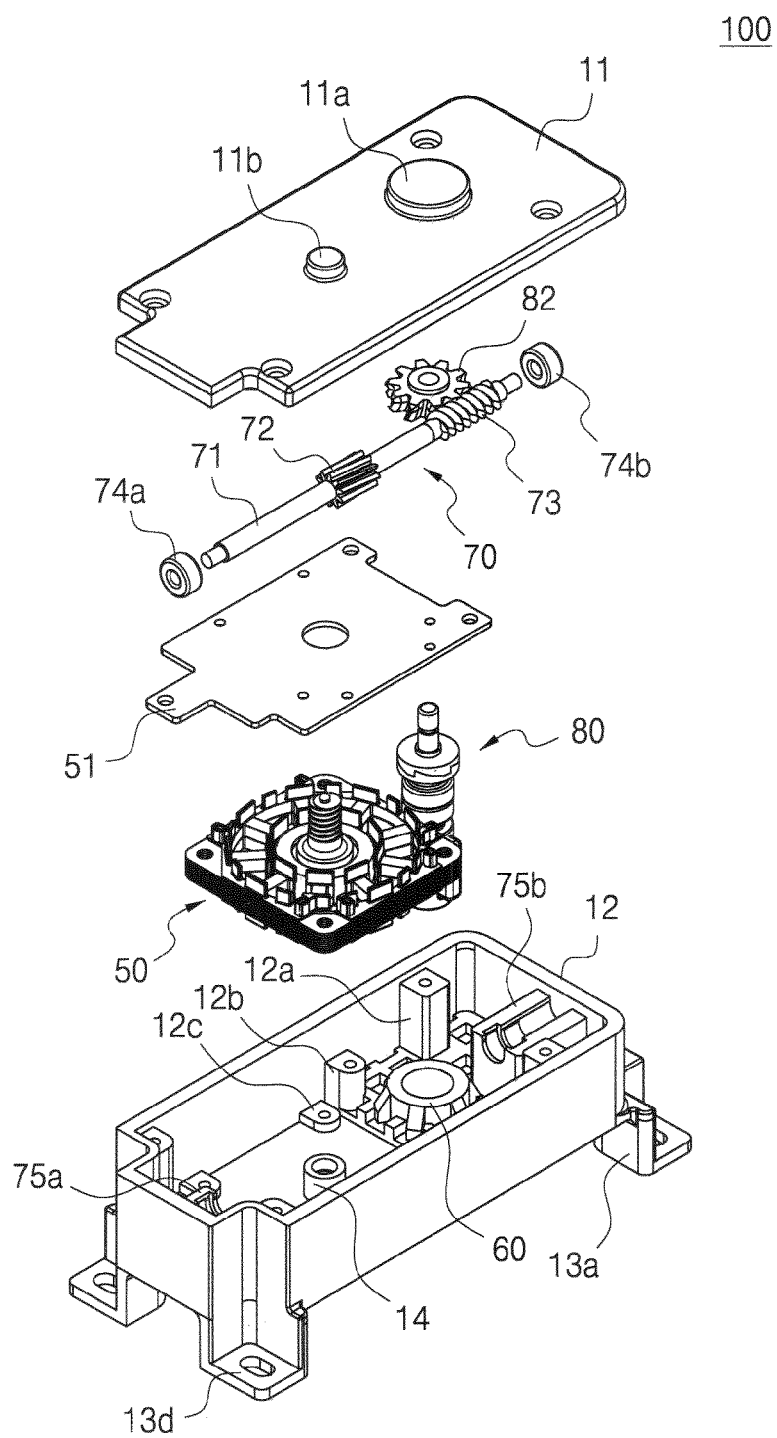

Hereinafter, embodiments of the present invention will be described in detail with reference to the accompanying drawings.

The sizes and shapes of the components shown in the drawings may be exaggerated for clarity and convenience. In addition, terms defined in consideration of the configuration and operation of the present invention may vary depending on the intention or custom of the user, the operator, and the like. Definitions of these terms should be based on the content of this specification.

An actuator according to an embodiment of the present invention is used for forward and backward movement or rotation of a passive object, and the following description describes an actuator for driving the passive object using a BLDC type driving motor as a power source.

Referring to FIGS. 1 to 9B, an actuator 100 according to an embodiment of the present invention includes: a housing 10 having first and second accommodation spaces 15a and 15b therein; a driving motor 50 which is installed in the first accommodating space 15a of the housing 10, is formed in the form of a BLDC type core motor, and generates a rotational output from a rotor 30; a printed circuit board (PCB) 51 which is installed on the upper side of the driving motor 50 and on which a motor driving circuit for generating a motor driving signal according to the reception of an external control signal is mounted; a gear train 70 which decelerates the rotational output of the driving motor 50, transmits the reduced rotational output to an output shaft 80, and reduces the rotational speed to increase torque; and the output shaft 80 which is installed in the second accommodation space 15b of the housing 10 and outputs the torque-increased rotational output transmitted through the gear train 70 to the outside of the housing 10.

The housing 10 includes a rectangular cylindrical body case 12 having an upper portion opened and first and second accommodation spaces 15a and 15b therein, and a cover 11 covering an upper portion of the body case 12.

The driving motor 50 formed in the form of a BLDC type core motor and generating rotational output from the rotor 30 is installed vertically in the first accommodation space 15a of the body case 12, and the output shaft 80 for outputting torque-increased rotational output to the outside of the housing 10 is installed in the second accommodation space 15b.

In addition, four first protrusions 12a used for fixing the cover 11 to the body case 12 by using fixing screws protrude from four corners inside the body case 12, and four second protrusions 12b protruding to support the PCB 51 with a space from the bottom of the housing protrude from four corners of the first accommodation space 15a, and thus, four third protrusions 12c required to fix the stator core 41 of the stator 40 protrude inside the four second protrusions 12b.

Furthermore, a bearing housing 14 protrudes in the first accommodation space 15a of the body case 12 to rotatably support the lower portion of a rotor support 33 while holding the lower portion of the rotor support 33 when the rotor 30 of the driving motor 50 rotates, and a bearing housing 60 for accommodating/supporting a pair of bearings 61 and 62 for rotatably supporting a second shaft 83b when the second shaft 83b of the output shaft 80 is extended to the outside of the body case 12 is integrally formed in the second accommodation space 15b.

A pair of bearing housings 75a and 75b for accommodating/supporting first and second power transmission shaft bearings 74a and 74b for rotatably supporting both ends of a power transmission shaft 71 of a gear train 70, which will be described later, protrude to be integrally formed in the first and second accommodation spaces 15a and 15b of the body case 12.

Support brackets 13a-13d required to fix the actuator 100 to the main body with fixing screws or the like protrude in four corners of the body case 12, and one through hole is formed in each of the support brackets 13a-13d.

A rotor shaft bearing 64 rotatably supporting the upper portion of the rotor support 33 is inserted into the bottom of the cover 11, and an output shaft bearing 63 rotatably supporting the upper portion of the first shaft 83a of the output shaft 80 is inserted into the bottom of the cover 11. Accordingly, circular protrusions 11a and 11b protrude from the upper surface of the cover 11 to secure a space into which the rotor shaft bearing 64 and the output shaft bearing 63 are inserted.

Figure 8A:
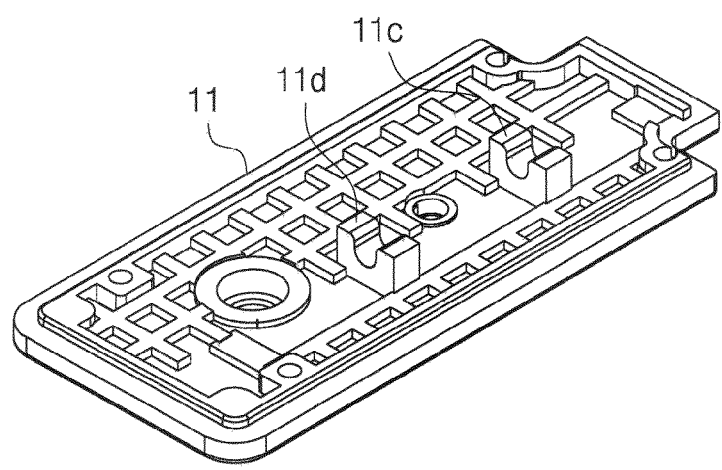
FIGS. 8A to 8C are perspective views illustrating a cover and a housing of the actuator shown in FIG. 1, and a cover to which a power transmission shaft is coupled, respectively.
Figure 8B:
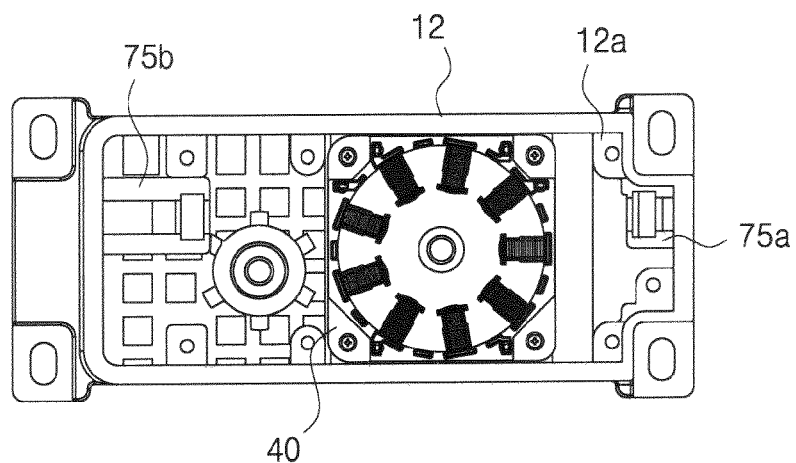
Figure 8C:
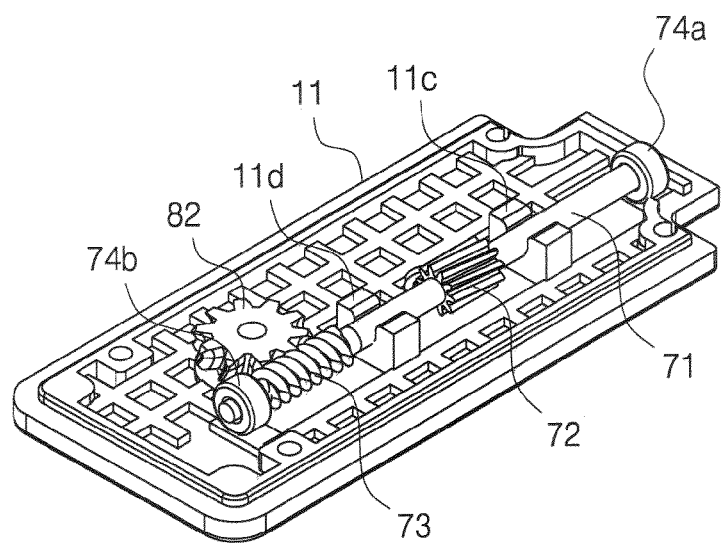

In addition, as shown in FIGS. 8A to 8C, first and second guide protrusions 11c and 11d protrude at intervals on the bottom of the cover 11 to guide two points of the power transmission shaft 71 to prevent bending or detachment of the power transmission shaft 71 when a very strong external pressure is applied to the worm gear 73 of the power transmission shaft 71.

The first and second guide protrusions 11c and 11 d are provided with a pair of protrusions on the left and right sides to prevent the power transmission shaft 71 from being bent or separated, respectively, and the first guide protrusion 11c is formed between a first power transmission shaft bearing 74a and a first worm wheel 72 of the power transmission shaft 71, and the second guide protrusion 11d is formed between the first worm wheel 72 of the power transmission shaft 71 and the output worm gear 73.

The driving motor 100 is formed in the form of the BLDC type core motor, and includes a rotor 30 with a lower end rotatably coupled to the outer periphery of the bearing housing 14 protruding from the bottom of the body case 12 and a stator 40 arranged at the outer side of the rotor 30 and arranged on the upper surface of the body case 12 to rotate the rotor 30 by generating a rotating magnetic field, and a first worm gear 35 is integrally formed on an outer circumferential portion of the extension portion of the rotor support 33 extending to the upper portion of the rotor 30.

Accordingly, the driving motor 100 is installed vertically in the form of a core motor from the bottom of the body case 12.

A magnet 31 arranged on the outer circumference of the back yoke 32 located inside the rotor 30 may be formed of a plurality split magnet pieces of N-poles and S-poles, or, preferably, magnets in which the N-poles and the S-poles are split and magnetized into multi-poles may be used in a ring-shaped magnet, and the back yoke 32 is installed on the rear surface of the magnet 31 to form a magnetic circuit.

The rotor support 33 of the rotor 30 is formed in a cup shape such that a lower end portion thereof is rotatably coupled to the bearing housing 14. In this case, the bearing housing 14 has a groove inside, and the groove is made of plastic, and a rotor shaft bearing 36 is inserted to reduce frictional force when the rotor rotates while the upper end thereof come in contact with the bottom surface of the rotor support 33.

Figure 7:
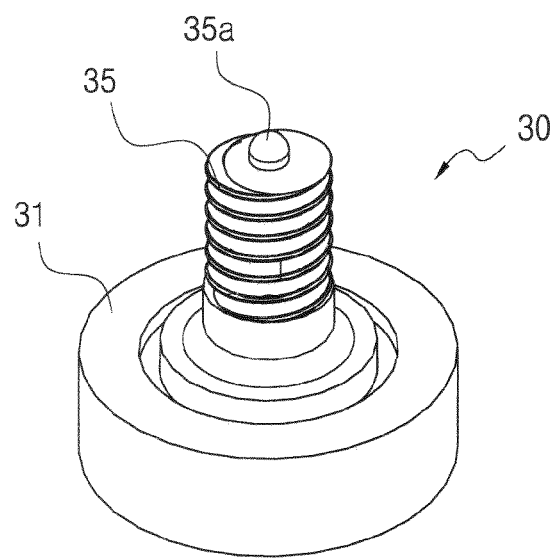
FIG. 7 is a front view illustrating a worm gear rotor applied to a BLDC type driving motor according to an embodiment of the present invention.

As shown in FIG. 7, the rotor 30 may have a structure in which the back yoke 32 and the magnet 31 are arranged on a lower side of the rotor support 33 and the first worm gear 35 is integrally formed on an upper side thereof.

In addition, a ball 35a is inserted between the upper portion of the hollow rotor support 33 and the rotor shaft bearing 64 inserted into the bottom of the cover 11 to reduce the frictional force when the rotor 30 rotates.

The stator 40 includes: a stator core 45 including a plurality of teeth 42 each having a T-shaped front end portion extending in an axial direction and a back yoke 41 connected to the plurality of teeth 42 to form a magnetic circuit; upper and lower insulators 44a and 44b surrounding an outer circumferential surface around which a coil 43 of each of the plurality of teeth 42 is wound, that is, a coil winding region, in upper and lower portions thereof and the coil 43 wound around an outer circumferential surface of each of the upper and lower insulators 44a and 44b.

In this case, as shown in FIG. 8B, a bobbin 44 (see FIG. 9B) made of an insulating material integrally formed with the teeth 42 may be formed instead of the upper and lower insulators 44a and 44b. The bobbin 44 may be integrally formed with a stator support surrounding the back yoke 42 together with the plurality of teeth 42.

A printed circuit board (PCB) 51 having a motor driving circuit mounted for generating a motor driving signal according to reception of an external control signal is mounted on an upper side of the driving motor 50.

The rotational output of the driving motor 50 is obtained from the first worm gear 35 integrally formed on the upper side of the rotor 30, and the first worm gear 35 extends upward through the through hole of the PCB 51.

Figure 4A:
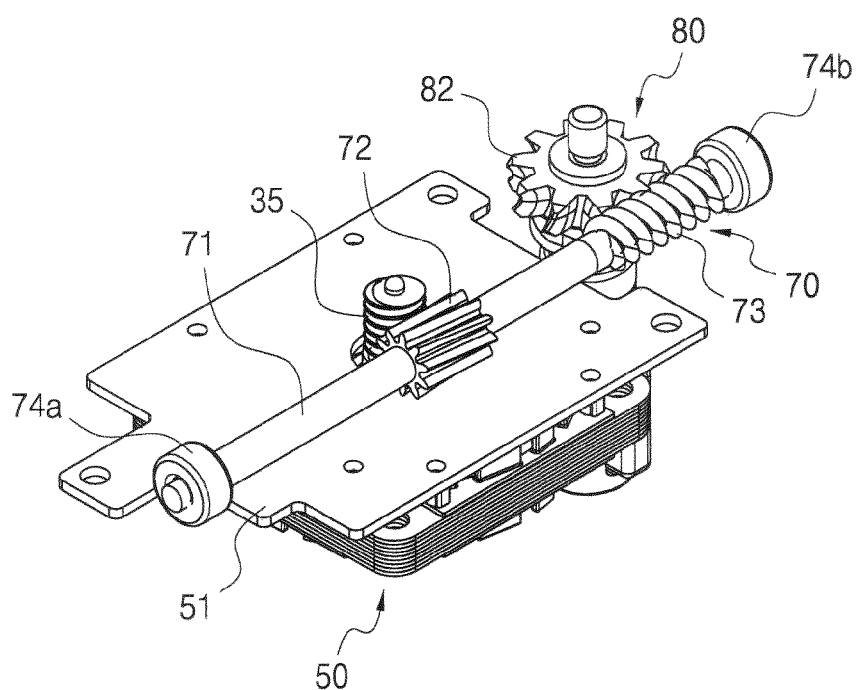
FIGS. 4A to 4C are diagrams illustrating a structure in which power is transmitted from a driving motor to an output end by using a power transmission shaft in the actuator illustrated in FIG. 1.
Figure 4B:
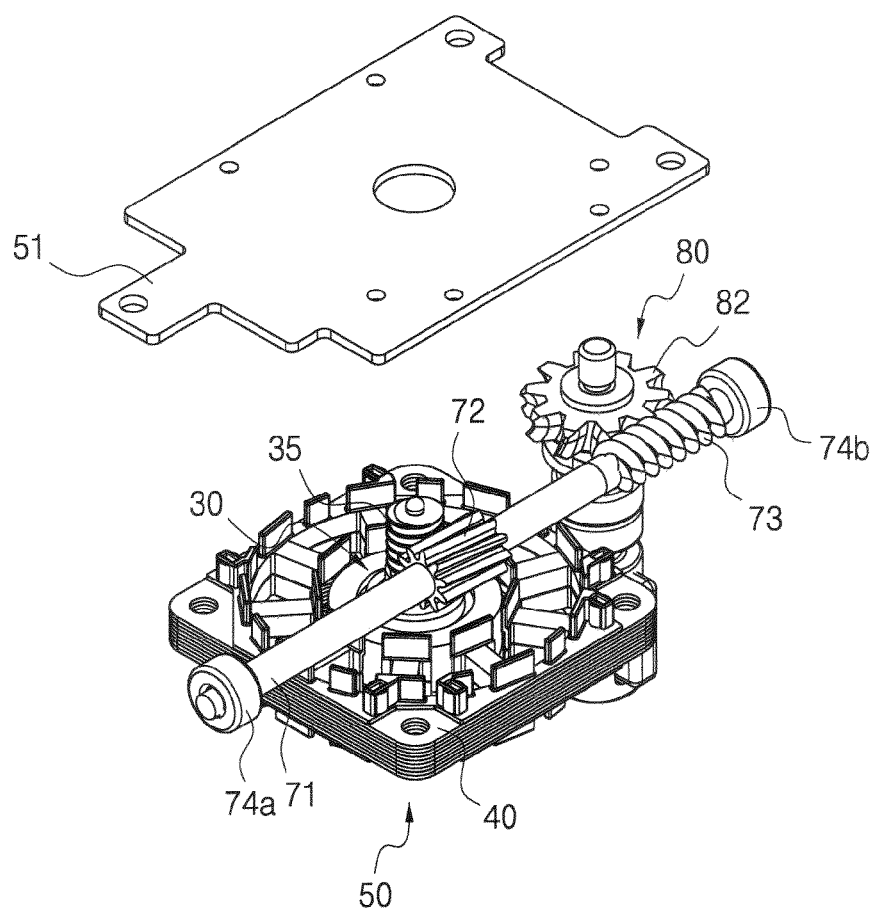
Figure 4C:
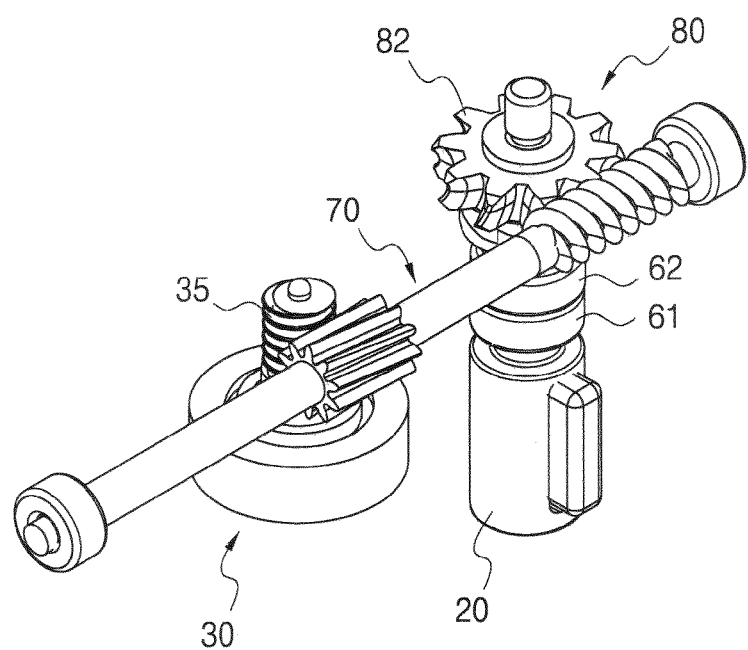
Figure 5:
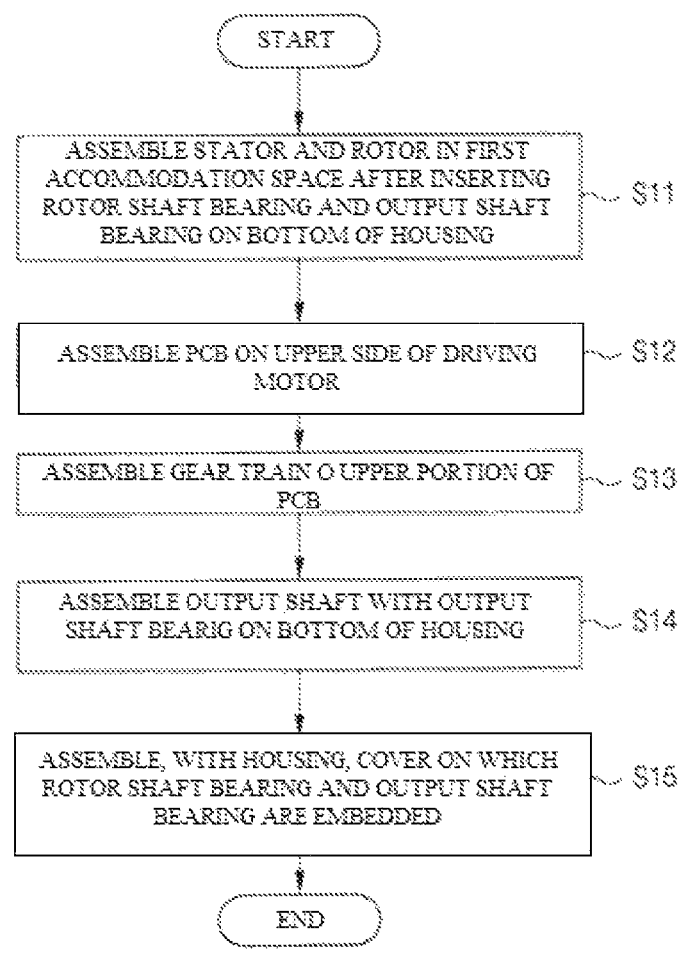
FIG. 5 is a flowchart illustrating an assembly order of an actuator according to the present invention.

As shown in FIGS. 4A to 4C, a gear train 70 is arranged in the longitudinal direction to reduce the rotational power of the driving motor (50) to transmit the rotational power to an output shaft 80 and to increase the torque by reducing the rotational speed, and in the second accommodation space 15b of the housing 10, the output shaft 80 is installed to output the torque-increased rotational output transmitted through the gear train 70 to the outside of the bottom of the housing 10, that is, the body case 12.

The gear train 70 has a structure in which a worm wheel 72 and an output worm gear 73 are integrally formed with each other at an interval on a power transmission shaft 71. In this case, the first worm wheel 72 is gear-coupled to the first worm gear 35 integrally formed with the rotor 30, and the output worm gear 73 is gear-coupled to a second worm wheel 82 of the output shaft 80 to transmit rotational power to the output shaft 80.

In addition, both ends of the power transmission shaft 71 are rotatably supported by first and second power transmission shaft bearings 74a and 74b installed in a pair of bearing housings 75a and 75b formed at both ends of the body case 12, respectively.

The gear train 70 of the inventive concept adopts a structure in which the worm wheel 72 and the output worm gear 73 are integrally formed at a distance on one power transmission shaft 71, thereby minimizing backlash by a gear train change structure that minimizes the number of coupled gears.

In addition, in some embodiments of the inventive concept, the output worm gear 73 provided in the gear train 70 may have a multiple thread screw structure to prevent the reduction gear ratio from increasing while lowering the rpm of the driving motor 50 which is a factor of increasing noise.

Furthermore, in some embodiments of the inventive concept, a small-sized driving motor 70 arranged vertically inside the housing is built in, and the power transmission shaft 71 formed by integrating the first worm wheel 72 and the output worm gear 73 constituting the gear train 70 is optimally placed inside the housing 10 to reduce the size.

Among automobile parts, there is a demand for a slip function that is driven by an actuator, to protrude in a single direction, and then to be squashed in one direction due to an accident or a possible impact.

Figure 6:
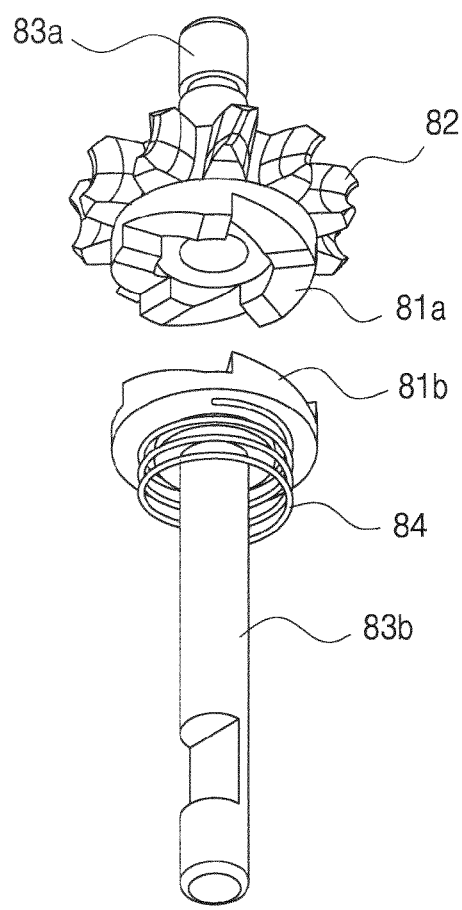
FIG. 6 is a perspective view illustrating upper/lower slip gear coupling portions applied to an output shaft of an actuator according to the present invention.

FIG. 6 is a perspective view illustrating upper/lower slip gear coupling portions applied to an output shaft of an actuator shown in FIG. 1.

Referring to FIG. 6, the actuator 100 according to the inventive concept includes a first shaft 83a and a second shaft 83b to which the output shaft 80 is gear-coupled to have a slip function on the output shaft 80. A second worm wheel 82 is formed on an upper portion of the first shaft 83a, an upper slip gear 81a is installed at a lower end portion thereof, and a lower slip gear 81b gear-coupled to the upper slip gear 81a is installed at an upper end portion of the second shaft 83b, and a lower end portion thereof extends to the outside of the body case 12.

The upper slip gear 81a and the lower slip gear 81b have an upper portion and a lower portion engaged with each other in a triangular saw tooth shape, to thus move when external pressure is applied in a single direction.

In addition, a coil spring or a plate spring 84 may be coupled to the lower side of the lower slip gear 81b so that slip occurs only when a certain force or more is applied to the slip gears 81a and 81b.

The upper portion of the first shaft 83a is rotatably supported by an output shaft bearing 63 installed in the cover 11, the second shaft 83b is rotatably supported by a pair of bearings 61 and 62 installed in the bearing housing 60, and the second shaft 83b of the output shaft 80 extends to the outside of the body case 12.

A key groove 83c is formed on the second shaft 83b extending to the outside of the body case 12, and the output coupling portion 20 used for coupling with a passive object may be coupled using a key 21 partially inserted into the key groove 83c.

As described above, in some embodiments of the inventive concept, since the output shaft 80 is provided with the slip gear coupling portion, and thus, when an external force greater than or equal to a predetermined force is applied to the passive object to which the output shaft 80 is connected, slip is generated between the slip gear coupling portions of the upper slip gear 81a and the lower slip gear 81b, thereby suppressing return of the passive object. As a result, when the actuator 100 of the inventive concept is used, it is possible to prevent damage to the internal structure due to the return of the passive object.

Hereinafter, an assembly method of the actuator 100 according to an embodiment of the inventive concept will be described with reference to FIGS. 5 and 8A to 8C.

First, the rotor shaft bearing 36 and output shaft bearings 61 and 62 are inserted into the bottom surface of the body case 12 forming the housing 10, and then the stator 40 and the rotor 30 are assembled in the first accommodation space 15a to prepare the driving motor 50 (S11).

Thereafter, the PCB 51 is installed on the upper portion of the driving motor 50 and is fixed (S12).

Subsequently, the worm wheel 72 of the gear train 70 is gear-coupled to the first worm gear 35 integrally formed with the rotor 30 on the upper portion of the PCB 51 (S13).

Subsequently, while assembling the output shaft 80 on the output shaft bearings 61 and 62 formed on the bottom of the body case 12, the worm wheel 82 of the output shaft 80 is gear-coupled to the output worm gear 73 of the gear train 70 (S14).

In this case, the assembly operation S13 of the gear train 70 and the assembly operation S14 of the output shaft 80 may be performed in a different order.

Thereafter, the cover 11 on which the output shaft bearing 63 is embedded is assembled to the upper portion of the body case 12 (S15).

In addition, as shown in FIGS. 8A and 8B, to improve the problem of the conventional structure of using a DC motor embedded inside a low-height housing, the driving motor 50 of the inventive concept is implemented into a BLDC driving motor 50 having a vertical assembly structure by installing bearings on the cover 11 of the housing 10 and the bottom of the body case 12, respectively, and assembling a BLDC motor in the form of a core motor.

As described above, in some embodiments of the inventive concept, the bearing insertion space for the driving motor 50 is provided at the cover 11 and the bottom of the body case 12, and bearings may be assembled inside the housing 10 without using a separate casing by using a structure that rotatably supports the top and bottom of the rotor 30, resulting in a simple assembly process and a low-cost production.

In addition, since there is no separate outer case in the driving motor 50, it is possible to increase the motor size, thereby increasing the output torque of the motor. Moreover, according to some embodiments of the inventive concept, the Hall sensor IC is easily installed on the lower surface of the PCB 51 to easily and accurately detect the rotor position signal by sensing the magnetic pole of the magnet 31 when the rotor 30 which is located at the lower side is rotated, thereby precisely controlling the rotor 30, and it is possible to operate without using a separate position sensing magnet required for a conventional DC motor.

As illustrated in FIGS. 8A to 8C, the actuator according to the embodiments of the inventive concept has bearing housings 75a and 75b integrally formed on the upper sides of both ends of the body case 12 to accommodate and support a pair of bearings 74a and 74b which accommodate and rotatably support both ends of the power transmission shaft 71, respectively, and first and second guide protrusions 11c and 11d are installed at intervals in the cover 11 to prevent bending of the power transmission shaft by preventing separation of the power transmission shaft while accommodating both sides of the power transmission shaft 71.

Accordingly, a very strong external pressure is applied to the cover 11 to prevent the power transmission shaft 71 from being bent or separated, and thus the normal operation cannot but be performed.

A typical motor used in the actuator has the difficulty in adopting the BLDC motor. However, in the embodiments of the present invention, a printed circuit board (PCB) 51 on which a motor driving circuit generating a motor driving signal is mounted on the upper side of a driving motor 50 according to the reception of an external control signal so that the motor torque may be increased and the position may be sensed in the vertical direction, and a Hall sensor IC (not shown) may be easily installed in the PCB 51 so that the rotor 30 may be precisely controlled.

The driving motor 50 employed in the actuator 100 of the present invention includes a stator 40 and a rotor 30 arranged on the bottom surface of the housing 10, and employs an inner rotor type BLDC motor.

Figure 9A:
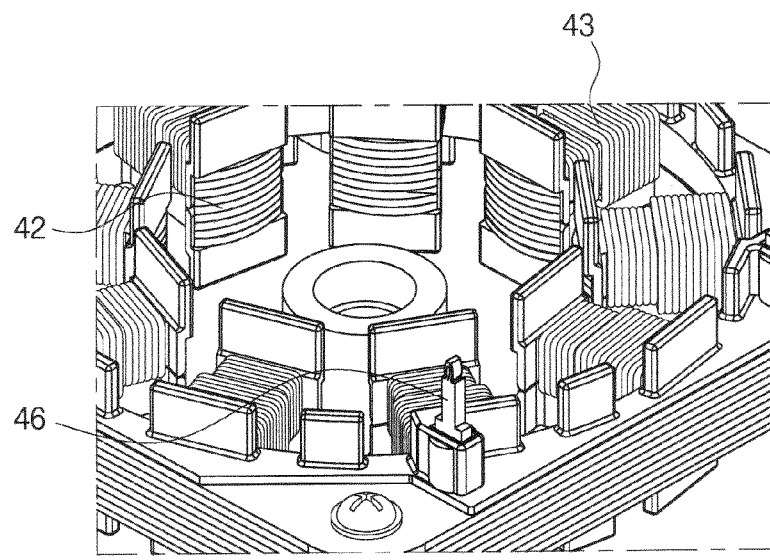
FIG. 9A is a partially enlarged perspective view of a stator to which a conventional press fit terminal is applied.
Figure 9B:
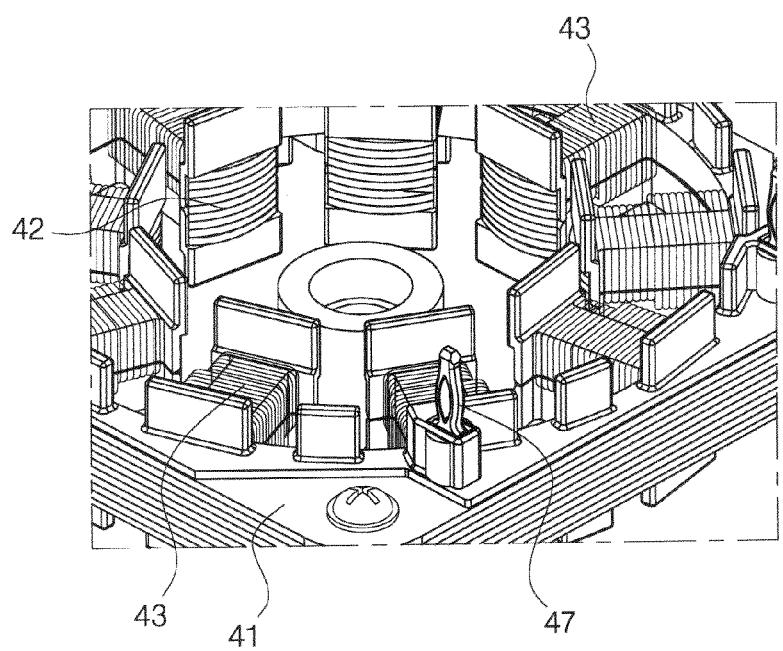
FIGS. 9B to 9D are views illustrating a connection structure between a BLDC type driving motor and a PCB having mounted thereon a motor driving circuit according to an embodiment of the present invention, and a perspective view of a stator to which a press fit terminal is applied, a perspective view of a press fit terminal, and a structure in which the press fit terminal is coupled to a bobbin, respectively.
Figure 9C:
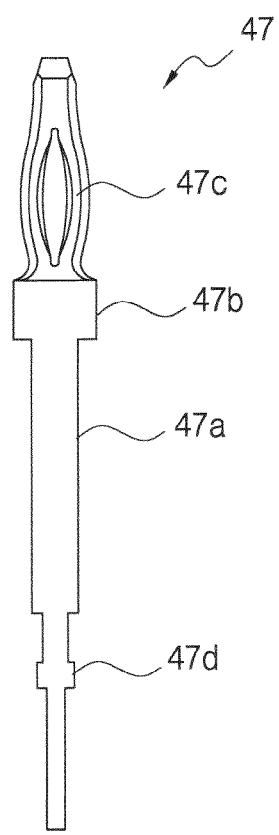
Figure 9D:
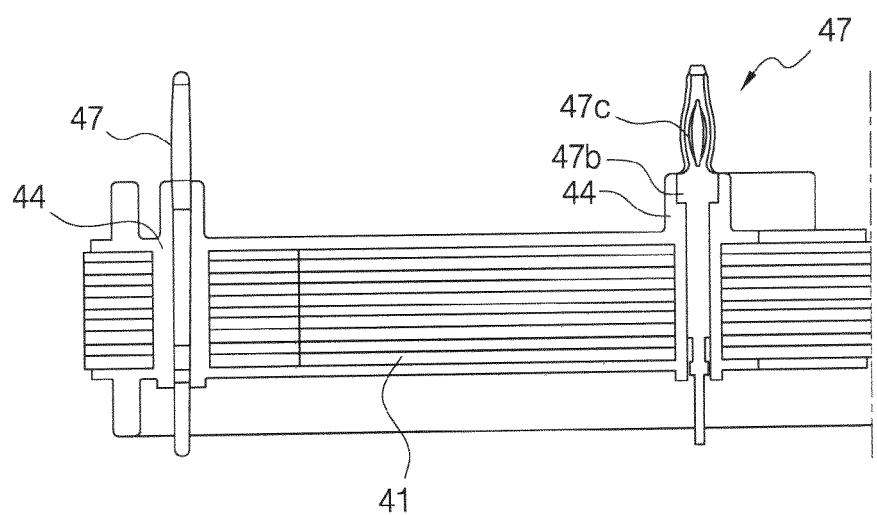

FIG. 9A is a partially enlarged perspective view of a stator to which a conventional press fit terminal is applied, and FIGS. 9B to 9D are views illustrating a connection structure between a BLDC type driving motor and a PCB having mounted thereon a motor driving circuit according to an embodiment of the present invention, and a perspective view of a stator to which a press fit terminal is applied, a perspective view of a press fit terminal, and a structure in which the press fit terminal is coupled to a bobbin, respectively.

In general, in order to interconnect a stator coil of a driving motor and a printed circuit board (PCB) on which a motor driving circuit is mounted, when connecting the coil with the PCB by using terminals, soldering is performed to promote an electrical connection.

As a method of connecting without any soldering, conventionally, the coil is press-fitted into the PCB without soldering using the press fit terminal 46 illustrated in FIG. 9A. The terminal 46 press-fitted into the PCB is a pin which is inserted while reducing the inner side due to the thin body thickness of the contractible coupling portion located at the lower end thereof, and is used for interconnection without soldering, while, when the terminal is fully inserted into the PCB, the upper end thereof is unfolded again by tension.

A general press fit terminal product has an inner hole and is press-fitted into a PCB hole by tension. However, the conventional press fit terminal with an inner hole has a disadvantage in which a mold structure is complicated and a unit price of the product is high.

In order to solve the above-described problem in the present invention, as shown in FIGS. 9B to 9D, a press fit terminal having no inner hole is used.

As illustrated in FIGS. 9C and 9D, the press fit terminal 47 of this invention has a coil connection portion 47c connected to the stator coil 43 at the top, and has a structure in which a protrusion step 47b serving as a height stopper by being caught by a stopper accommodation hole provided in the bobbin 44 when the press fit terminal 47 is press-fitted into the bobbin 44 is formed at a lower side of the coil connection portion 47c, and a hook 47d is formed at a lower portion of the body 47a to prevent the press fit terminal 47 from being separated when the press fit terminal 47 is press-fitted into the bobbin 44.

The press-fit terminal 47 is designed to perform the same function by removing an inner hole in which shrinkage occurs when being press-fitted into a PCB and spreading an inner hole place so that the thickness of the inner hole place has a thickness of ½ or ⅓ of a product thickness.

As described above, the actuator 100 using the small-sized driving motor of the present invention connects the stator 40 with the PCB 51 by using the low-cost press fit terminal 47 without an inner hole to interconnect the stator coil 43 and the PCB 51 of the driving motor 50.

In the actuator 100 according to this invention, when the coil 43 of the stator 40 is wound around the plurality of teeth 41, in the driving motor 50, the coil 43 may be wound in a U, V, and W three-phase structure, and the other end of the U, V, and W three-phase coil 43 may be connected in a star-connection manner. Moreover, the driving motor 50 may be driven by a 6-step full-wave driving method using an inverter after receiving a rotor position signal from two or three Hall sensors, for example, in a motor driving circuit.

Hereinafter, an operation of the actuator 100 according to the present invention will be described with reference to FIGS. 1 to 9D.

In the actuator 100 of this invention, first, when the BLDC driving motor 50 installed on the bottom of the housing 10 is driven, the rotor 30 rotates and the first worm gear 35 integrally formed on the upper side of the rotor 30 rotates in the same direction.

When the first worm gear 35 rotates, the worm wheel 72 of the gear train 70 gear-coupled to the first worm gear 35 rotates and the power transmission shaft 71 also rotates.

As a result, the output worm gear 73 formed on the other side of the power transmission shaft 71 rotates the output worm wheel 82 of the gear-coupled output shaft 80.

Accordingly, when the output shaft 80 rotates according to the rotation of the output worm wheel 82, the output coupling portion 20 coupled to the second shaft 83b of the output shaft 80 extending outside the body case 12 also rotates to rotate the passive object.

In the present invention, for example, when the BLDC driving motor 50 is rotated at about 800 rpm, the BLDC driving motor 50 is decelerated to approximately 400:1 through the gear train 70, and the output shaft 80 is reduced in rotation speed to about 2 rpm, resulting in an increase in a large torque.

While the present invention has been particularly shown and described with reference to exemplary embodiments thereof, by way of illustration and example only, it is clearly understood that the present invention is not to be construed as limiting the present invention, and various changes and modifications may be made by those skilled in the art within the protective scope of the invention without departing off the spirit of the present invention.

INDUSTRIAL APPLICABILITY

The present invention can be applied to an actuator having a power transmission structure capable of minimizing backlash by a gear train change structure in which a worm wheel and a worm gear are integrally formed at intervals on a power transmission shaft to minimize the number of coupling gears.

What is claimed is:
1. An actuator comprising:
a housing having first and second accommodation spaces;
a driving motor having a BLDC type motor installed in the first accommodation space of the housing and generating a rotational output from a rotor;
a printed circuit board (PCB) mounted on an upper side of the driving motor and having a motor driving circuit mounted for generating a motor driving signal according to reception of an external control signal;

a gear train installed on an upper portion of the PCB in a longitudinal direction to reduce the rotational output of the driving motor to increase a torque; and an output shaft installed in the second accommodating space of the housing and outputting the torque increased by the rotational output transmitted through the gear train to the outside of the housing, wherein the output shaft comprises: a first shaft having a second worm wheel installed at an upper portion thereof to be gear-coupled to a first worm gear of a power transmission shaft and an upper slip gear installed at a lower end thereof; and a second shaft in which a lower slip gear engaged with the upper slip gear is installed at an upper end thereof and the lower end portion is extended to the outside of the housing, and wherein the upper slip gear and the lower slip gear have an upper portion and a lower portion engaged with each other in a triangular saw tooth shape, to thus cause a slip when an external pressure is applied in a single direction.

2. The actuator of claim 1, further comprising a second worm gear integrally formed in an extension portion extending to an upper portion of the rotor of the driving motor, wherein the gear train comprises:

the power transmission shaft;

a first worm wheel formed on one side of the power transmission shaft and gear-coupled to the second worm gear; and the first worm gear formed on the other side of the power transmission shaft.

3. The actuator of claim 2, wherein the first worm gear is made of a multiple thread screw.

4. The actuator ice of claim 1, wherein a coil spring or a plate spring is coupled to a lower side of the lower slip gear so that the slip occurs only when a certain force or more is applied to the lower slip gear.

5. The actuator of claim 1, wherein the upper portion of the first shaft is rotatably supported by an output shaft bearing installed in a cover of the housing, the second shaft is rotatably supported by a pair of bearings installed in a bearing housing installed on a bottom of a body case of the housing, and the second shaft is extended to the outside of the body case.

6. The actuator an of claim 1, wherein the driving motor comprises:

a rotor bearing protruding from a bottom of the housing;

the rotor having a lower end portion of a rotor support rotatably coupled to an outer circumference of the rotor bearing; and a stator arranged outside the rotor with an air gap and generating a rotating magnetic field to rotate the rotor, wherein the first worm gear is integrally formed on an outer circumferential portion of an upper end of the rotor support.

7. The actuator of claim 1, further comprising first and second guide protrusions protruding from a bottom surface of a cover of the housing at intervals to prevent the power transmission shaft from being bent or separated when an external pressure equal to or greater than a preset magnitude is applied to the first worm gear of the power transmission shaft.

8. The actuator of claim 1, further comprising an output coupling portion coupled to the second shaft extending to the outside of a body case of the housing by using a key.

* * * * *